US008310207B2

(12) United States Patent
De Cremoux (10) Patent No.: US 8,310,207 B2
(45) Date of Patent: Nov. 13, 2012

(54) MULTI-PURPOSE BATTERY CHARGING CIRCUIT

(75) Inventor: Guillaume De Cremoux, Edinburgh (GB)

(73) Assignee: ST-Ericsson SA, Geneva (CH)

( * ) Notice: Subject to any disclaimer, the term of this patent is extended or adjusted under 35 U.S.C. 154(b) by 630 days.

(21) Appl. No.: 12/063,460

(22) PCT Filed: Aug. 7, 2006

(86) PCT No.: PCT/IB2006/052718
§ 371 (c)(1),
(2), (4) Date: May 17, 2010

(87) PCT Pub. No.: WO2007/020558
PCT Pub. Date: Feb. 22, 2007

(65) Prior Publication Data
US 2010/0231171 A1  Sep. 16, 2010
US 2011/0291620 A9  Dec. 1, 2011

(30) Foreign Application Priority Data
Aug. 17, 2005  (EP) ..................... 05107541

(51) Int. Cl.
H02J 7/00 (2006.01)
H02J 7/04 (2006.01)
(52) U.S. Cl. ......... 320/137; 320/125; 320/128; 320/145
(58) Field of Classification Search .................... 320/137
See application file for complete search history.

(56) References Cited

U.S. PATENT DOCUMENTS

| 5,875,085 A * | 2/1999 | Farley .............................. 361/18 |
| 6,194,793 B1 | 2/2001 | Fisher, Jr. |
| 6,452,364 B1 * | 9/2002 | Saeki et al. .................... 320/137 |
| 7,391,184 B2 * | 6/2008 | Luo et al. ....................... 320/137 |
| 7,498,769 B1 * | 3/2009 | Potanin et al. ................. 320/125 |
| 7,545,120 B2 * | 6/2009 | Breen et al. .................... 320/145 |
| 2004/0108838 A1 * | 6/2004 | Chen ............................. 320/137 |

FOREIGN PATENT DOCUMENTS

| CN | 1531161 A | 9/2004 |
| EP | 0673100 A1 | 9/1995 |
| EP | 1447897 A1 | 8/2004 |
| EP | 1484664 A2 | 12/2004 |
| EP | 1555741 A2 | 7/2005 |
| JP | 11178328 A | 7/1999 |
| JP | 2004248487 A | 9/2004 |

* cited by examiner

Primary Examiner — M'Baye Diao (57) ABSTRACT

The present invention relates to a multi-purpose battery charging circuit configuration able to be selectively in a simple charge mode when intended for low-end solutions (option 3) or in a charge-and-play mode when intended for medium- and high-end solutions (options 1 and 2 respectively), while maintaining the supply voltage of any portable and mobile electronic devices with an acceptable noise level. The selection will be made possible by the use of multiplexers (MUX1, MUX2). If the option 1 is chosen, the bi-directional switching device (210) will be controlled by a driver circuit (340) for allowing the current which flows through it towards the battery (20) to strongly increase and thereby maintaining the voltage across the circuitry (10) at a value slightly greater than the voltage across the battery (20). If the option 2 is chosen, the synchronous step-down voltage regulator (310) comprising at least the driver circuit (350) and the switching devices (200, 230) will track the voltages across the circuitry (10) and the battery (20) for regulating the voltage across the circuitry (10) at a value in the vicinity of the voltage across the battery (20). If the option 3 is chosen, the battery (20) which cannot be separated from the circuitry (10) will be in a simple charge mode while being charged through the switching device (210).

12 Claims, 5 Drawing Sheets

MULTI-PURPOSE BATTERY CHARGING CIRCUIT

The present invention relates to a battery charging circuit, and is more particularly directed to a multi-purpose integrated battery charging circuit able to be selectively configured in a simple charge mode or in a charge-and-play mode while maintaining the supply voltage of any portable and mobile electronic devices with an acceptable noise level.

Portable and mobile devices, such as a cellular phone, personal digital assistant (PDA), portable personal computer, camcorder, digital camera or MP3 player for example, need to have their circuitry electrically supplied by an operational rechargeable battery whenever no alternative electric power source is available. When the battery is fully discharged and is therefore no longer operational, it can nevertheless be charged again by being electrically fed by a DC power source such as a wall plug adapter. So two charging configuration modes can be obtained: the simple charge mode which is commonly used in low-end solutions and wherein the device can operate only from the battery to which it is connected, and the charge-and-play mode which is commonly used in medium- and high-end solutions and wherein the battery of the device can be removable and is separated from the circuitry. In the first case, the user must first wait for a while until the battery is charged before using the device again, whereas in the second case, the user can still continue using it in the same manner as a portable computer while the battery is being charged, since the wall-plug adapter simultaneously supplies the circuitry and the battery of the device. Despite a larger flexibility through such utilization, the charge-and-play mode can however generate large ripple voltages on the terminal to which the circuitry is connected and therefore become totally unsuitable for playing or operating audio and RF devices.

Figure 1A:
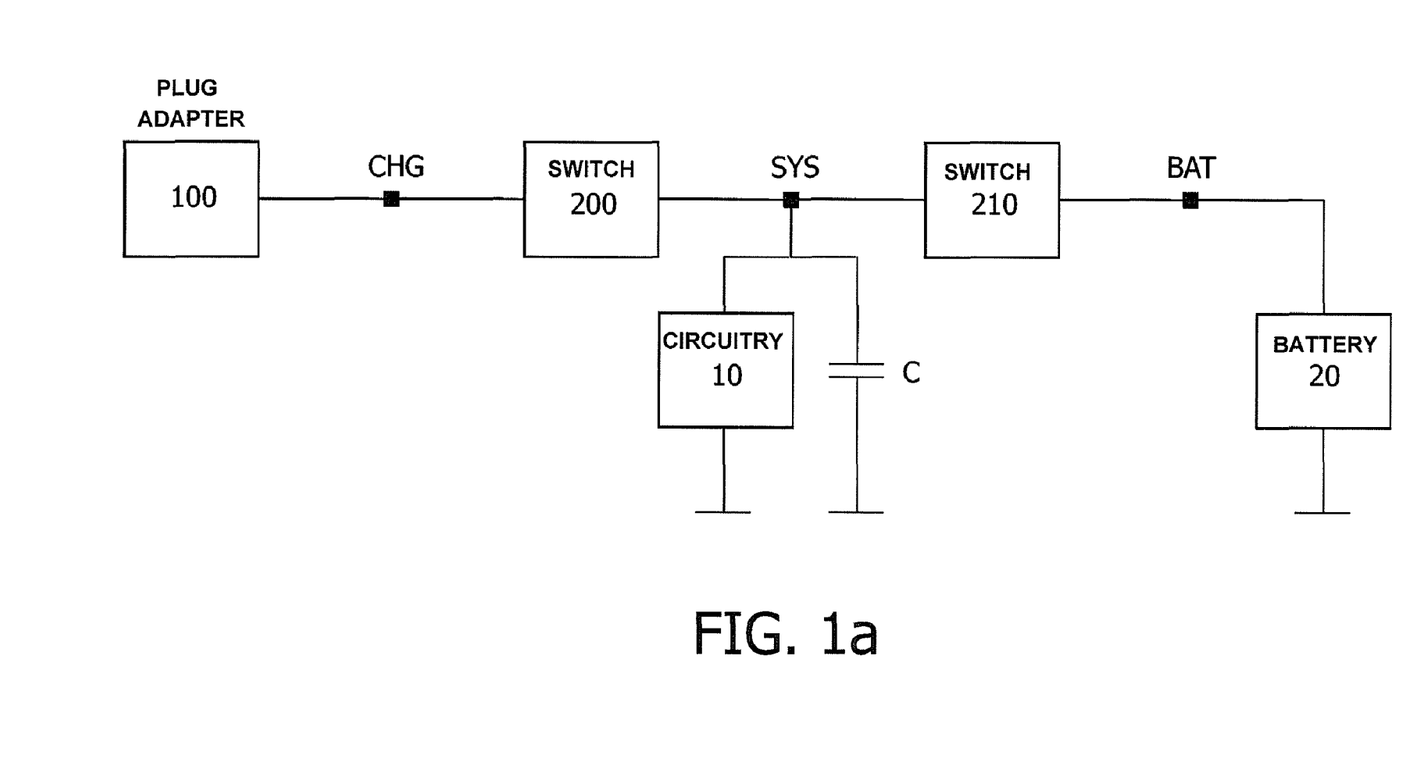
FIG. 1a shows a conventional integrated battery charging circuit in a charge-and-play mode, wherein the voltage $V_{SYS}$ is not regulated.
Figure 1B:
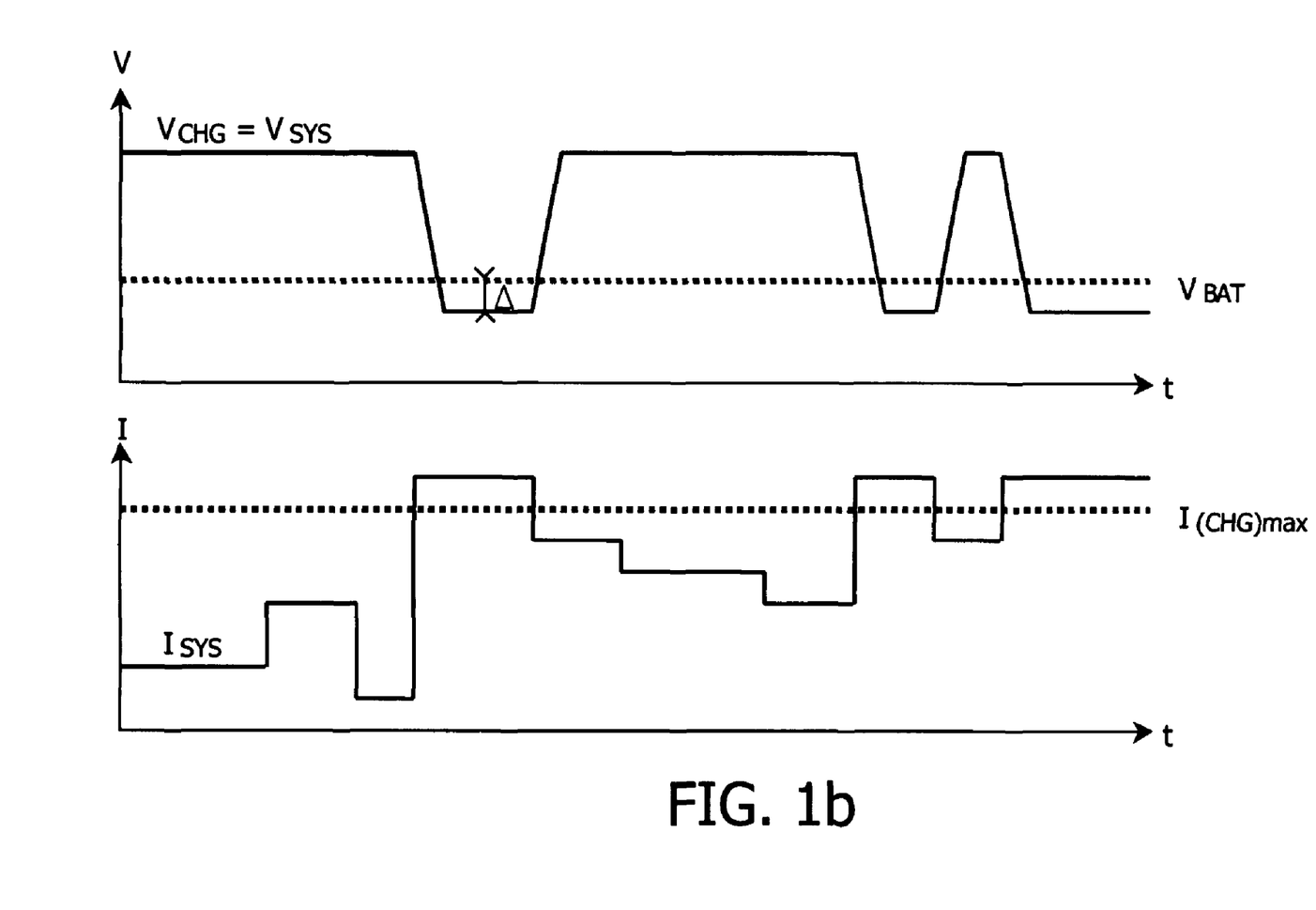
FIG. 1b shows the plots versus time of the unregulated voltage $V_{SYS}$ at the terminal SYS to be connected to the circuitry and the corresponding current.

Such a drawback can be explicitly illustrated by referring to FIG. 1a wherein a conventional integrated battery charging circuit in a charge-and-play mode is depicted, and to FIG. 1b wherein the plots versus time of the voltage $V_{SYS}$ at the terminal SYS connected to the circuitry and the corresponding current $I_{SYS}$ are shown. In FIG. 1a, the wall plug adapter 100 connected at the terminal CHG charges the battery 20 of the portable or mobile device at the terminal BAT, through two switching devices 200 and 210 separated by the terminal SYS, while simultaneously supplying the circuitry 10 disconnected from the battery 20 with a voltage $V_{SYS}$ at the terminal SYS. The capacitor C connected across the circuitry 10 at the terminal SYS is an external output filter capacitor aiming to smooth the voltage transitions. The first switching device 200 connected between the terminals CHG and SYS will be supposed to act as an ideal switch and will be hence considered as a short-circuit in a forward mode, such that the voltage potentials at the terminals CHG and SYS will be identical while satisfying the relation: $V_{CHG}=V_{SYS}$. Its role is essentially to protect the circuitry 10 from over voltage by decoupling it from the wall plug adapter 100 when switching OFF. The second switching device 210 connected between the terminals SYS and BAT is a bi-directional switch for allowing the current to revert when the battery 20 must supply power to the circuitry 10. It will be deemed to behave as an ideal diode when the current flows from the terminal BAT towards the terminal SYS. Referring to FIG. 1b, the wall plug adapter 100 has a limited current capability (e.g. $I_{(CHG)max}=0.8$ A) and a nominal voltage $V_{nom}$ (e.g. 5 V) that it can maintain only if the total sum of the currents which feed the circuitry 10 (refer to $I_{SYS}$) and the battery 20 is lower than the maximum current $I_{(CHG)max}$ able to be delivered by the wall plug adapter 100. If the circuitry 10 requires a current higher than $I_{(CHG)max}$, then the wall plug adapter voltage $V_{CHG}$ as well as $V_{SYS}$ drop until to become lower than the battery voltage $V_{BAT}$ (e.g. 3 V if, at this instant, the battery has not yet reached its nominal charging voltage of 3.6 V for example) in order to allow the battery 20 to provide to the circuitry 10 the missing current flowing through the second switching device 210 from the terminal BAT towards the terminal SYS. The gap between $V_{SYS}$ and $V_{BAT}$ will then correspond to the voltage drop $\Delta$ generated across the second switching device 210 (e.g. about 300 mV if the second switching device 210 which behaves as an ideal diode has a resistance of $0.3\Omega$ and is passed through by a current of 1 A). This situation, which depends both on the importance of the activity generated by the circuitry 10 and on its occurrence frequency, may be encountered when, for example, a cellular phone has a speaker which is sporadically activated to play music. Thus, the terminal SYS to which the circuitry 10 is connected may be subject to a large voltage variation (e.g. about 2 V if $V_{nom}=5$ V and $V_{BAT}=3$ V) which is totally at random, such that the corresponding voltage $V_{SYS}$ can be sufficiently noisy compared to the voltage $V_{BAT}$ supplied by the charged battery 20 to the circuitry 10 when both are connected together and totally unsuitable for supplying audio and RF devices.

A common way to overcome these deficiencies is to attempt as often as possible to hold the voltage $V_{SYS}$ at a voltage potential in the vicinity of $V_{BAT}$ in order to drastically minimize the voltage variation at the terminal SYS to which the circuitry 10 is connected. This can be realized by charging the battery 20 with a very large current which flows through the second switching device 210. Thus, even if the circuitry 10 has a low activity which requires no current higher than $I_{(CHG)max}$ and therefore no additional power supply from the battery 20, the total sum of the currents charging the battery 20 and supplying the circuitry 10 may already exceed the maximum current $I_{(CHG)max}$ able to be delivered by the wall plug adapter 100. As a result, the wall plug adapter voltage $V_{CHG}(=V_{SYS})$ decreases until a voltage level slightly higher than the battery voltage $V_{BAT}$, such that the battery 20 is still operating in charging mode but with a lower charge current in order to have the total sum of the currents which feed the circuitry 10 and the battery 20 equal to $I_{(CHG)max}$. Therefore, any excess of activity of the circuitry 10 will result in a minor fluctuation of $V_{SYS}$. Nevertheless, this solution can no longer be considered as sufficient when, upon charge completion, the wall plug adapter 100 switches to a trickle charge mode for enabling the battery 20 to be kept fully charged using a trickle charge rate low enough to avoid overcharging. Under these conditions, the current injected to the battery 20 is strongly reduced and cannot guarantee that the total sum of the currents flowing through the battery 20 and the circuitry 10 exceeds the maximum current $I_{(CHG)max}$ outputting from the wall plug adapter 100. It results that the wall plug adapter voltage $V_{CHG}(=V_{SYS})$ may increase again and random ripples on $V_{SYS}$ occur.

It is therefore an object of the present invention to provide a battery charging circuit intended for high-end portable and mobile electronic devices in order to minimize any ripples which may arise on the voltage $V_{SYS}$ supplying the circuitry when in a charge-and-play mode, as well as a multi-purpose battery charging circuit capable to be selectively configured in a simple charge mode or a charge-and-play mode in order to be compatible with any low-, medium- or high-end portable and mobile electronic devices.

This object is achieved by a battery charging circuit configuration as claimed in claim 1 and a multi-purpose battery charging circuit configuration as claimed in claim 7.

Accordingly, a battery charging circuit operating in a charge-and-play mode comprises a voltage regulator tracking the voltage $V_{BAT}$ at the terminal BAT to which a battery of a portable or mobile electronic device is connected, and regulating the voltage $V_{SYS}$ at the terminal SYS to which the circuitry of this device is connected, at a value in the vicinity of $V_{BAT}$ and slightly greater than $V_{BAT}$. Thereby, the voltage variation at the terminal SYS strongly diminishes such that the amplitude of the ripples on $V_{SYS}$ is comparable to the one on $V_{BAT}$ when the circuitry stays connected to the battery.

Furthermore, the battery charging circuit comprises a bi-directional switching device connected between the battery and the circuitry and through which a current flows. Thereby, the battery may revert the current for supplying the circuitry with an extra current if the current flowing through the circuitry exceeds the maximum current to be delivered by a DC power source such as a wall plug adapter.

The voltage regulator may be a DC-DC controller leading to the use of an external coil. Thereby, heat dissipation can be efficiently alleviated. Moreover, since such a coil is expensive in terms of price and bulky in terms of area available on a printed circuit board (PCB), this configuration will be thus affordable for high-end solutions.

Additionally, a multi-purpose battery charging circuit, partially built from the aforementioned battery charging circuit, is selectively configurable owing to multiplexers for operating in a simple charge mode intended for low-end solutions when the circuitry is connected to the battery or in a charge-and-play mode intended either for medium-end solutions when no coil associated with a DC-DC controller is used or for high-end solutions when a coil associated with a DC-DC controller is used. Being designed to be an integrated circuit made from a single silicon implementation, such a circuit thereby offers a high degree of flexibility, saving a lot of development and adaptation time.

For medium-end solutions, the bi-directional switching device, which is controlled by a driver means such as a digital and analog controller means, allows the battery to be charged with a much larger current using programming means for example such that the total sum of the currents exceeds the maximum current able to be delivered by the DC power source. Despite the fact that no DC-DC controller is used, the voltage $V_{SYS}$ supplying the circuitry can thereby be maintained at a voltage level in the vicinity of $V_{BAT}$ even if the circuitry generates a low activity.

Further advantageous developments relating in particular to the protection from thermal damage are also defined in the dependent claims.

The present invention will be now described based on preferred embodiments with reference to the accompanying drawings in which.

Figure 2A:
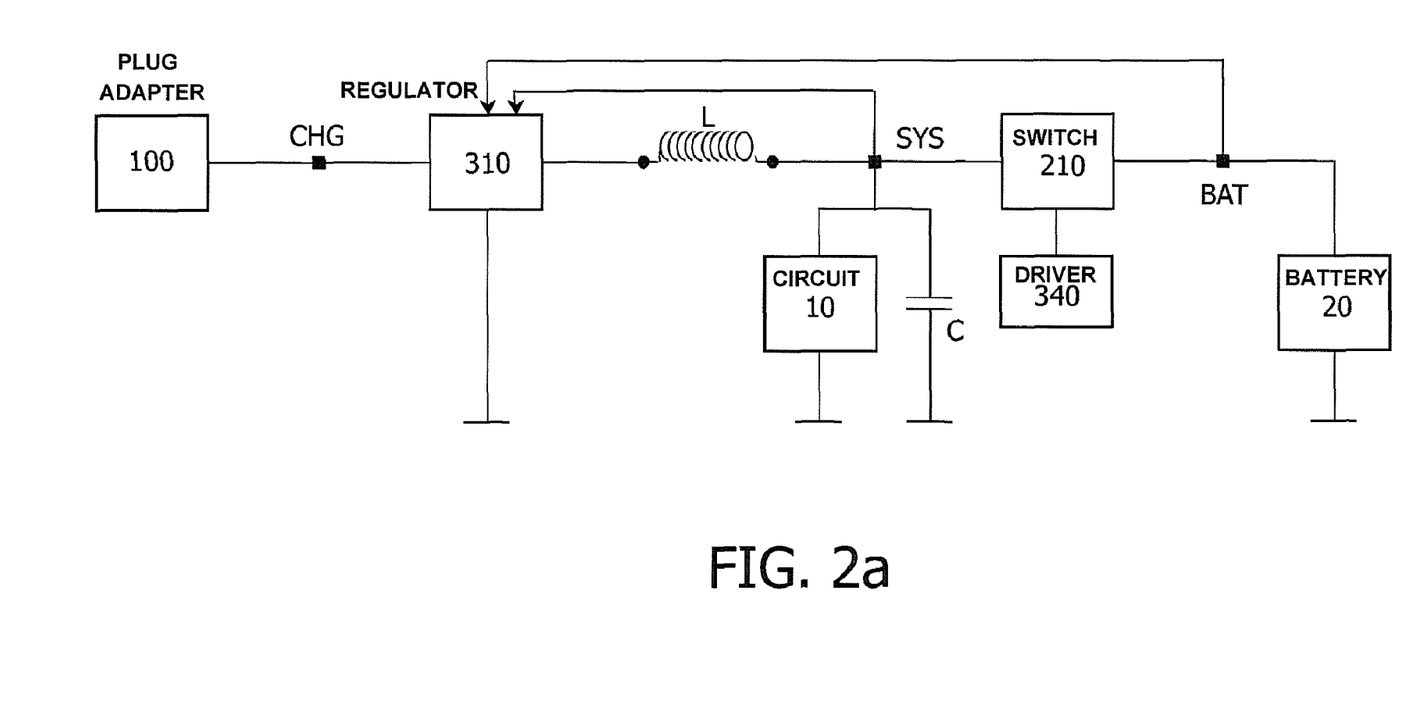
FIG. 2a shows an integrated battery charging circuit in a charge-and-play mode according to the first preferred embodiment of the invention, wherein $V_{SYS}$ is regulated at a value in the vicinity of $V_{BAT}$ and slightly greater than $V_{BAT}$.
Figure 2B:
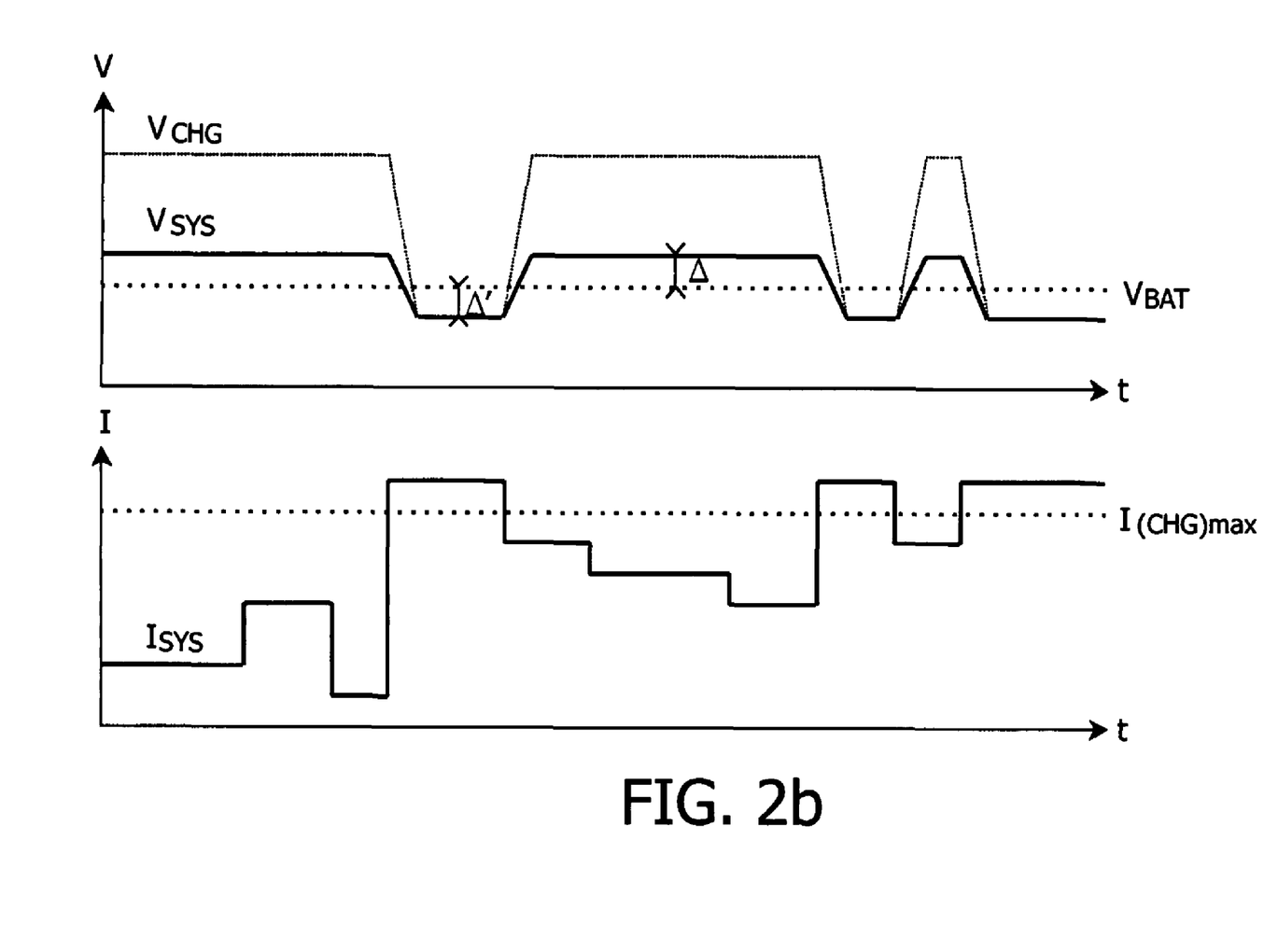
FIG. 2b shows the plots versus time of the regulated voltage $V_{SYS}$ at the terminal SYS to be connected to the circuitry and the corresponding current.

In the following, the first preferred embodiment will be described in connection with an integrated battery charging circuit in a charge-and-play mode which allows the voltage $V_{SYS}$ connected to the circuitry to be regulated to a value close to the voltage $V_{BAT}$, such as depicted in FIGS. 2a and 2b.

In FIG. 2a, the integrated battery charging circuit in a charge-and-play mode according to the first preferred embodiment of the invention is based on the circuit from FIG. 1a wherein the first switching device 200 (e.g. MOSFET, BJT or any other controllable semiconductor switching device) is now part of a voltage regulator 310 connected between the terminals CHG and SYS and tracking the voltages $V_{BAT}$ at the terminal BAT and $V_{SYS}$ at the terminal SYS. As depicted in FIG. 2b, this voltage regulator 310 will regulate the voltage $V_{SYS}$ at the terminal SYS at a value slightly greater than $V_{BAT}$. Thus, all the variations of $V_{BAT}$ will be tracked by the voltage regulator 310 in order to always maintain the voltage $V_{SYS}$ at a constant level slightly higher ($V_{BAT}+\Delta$) than $V_{BAT}$, wherein $\Delta$ is a trade off between a value small enough so as to have the noise level on $V_{SYS}$ (sum of $\Delta$ and $\Delta'$, wherein $\Delta'$ may be a predetermined value) small enough, and a value large enough such that the second switching device 210 controlled by a driver means 340 can properly charge the battery 20 from $V_{SYS}$. When the activity of the circuitry 10 connected at the terminal SYS is increasing until the current capability of the wall plug adapter 100 is reached, the voltage $V_{SYS}$ ($=V_{CHG}$) will slightly decrease under $V_{BAT}$ by the predetermined value $\Delta'$ so that the battery 20 can behave as a generator while reverting the current which now flows from the terminal BAT towards the terminal SYS through a bi-directional switch such as the second switching device 210 controlled by a driver means 340. At the terminal SYS, the voltage gap $\Delta V$ which is equal to $\Delta+\Delta'$ will be therefore low enough in order to neglect the disturbances generated by the ripples on $V_{SYS}$. However, the large shift from $V_{CHG}$ to $V_{BAT}-\Delta'$ at the terminal CHG will cause the voltage regulator 310 to generate a too high power dissipation (($V_{CHG}-(V_{BAT}-\Delta'')) \times I_{(CHG)max}$) able to damage the die when heat sinks are missing. The presence of an energy storage means such as an external coil L is thus widely recommended and it is the reason why the voltage regulator 310 will be preferably a step-down (buck) voltage regulator built, for example, with a step-down DC-DC controller. To achieve a higher efficiency, a technique called "synchronous rectification" will be used in order to replace the common flywheel diode with an additional switching device 230 (not represented here) having a polarity different from the first switching device 200 and to thereby remove its threshold voltage in conduction mode. A synchronous step-down DC-DC controller will be then obtained.

Since the coil L is a costly and bulky component, this first preferred embodiment will be however affordable in terms of price and area on the printed Circuit Board (PCB) for high-end portable and mobile electronic devices such as expensive mobile phones and PDAs for example.

Figure 3:
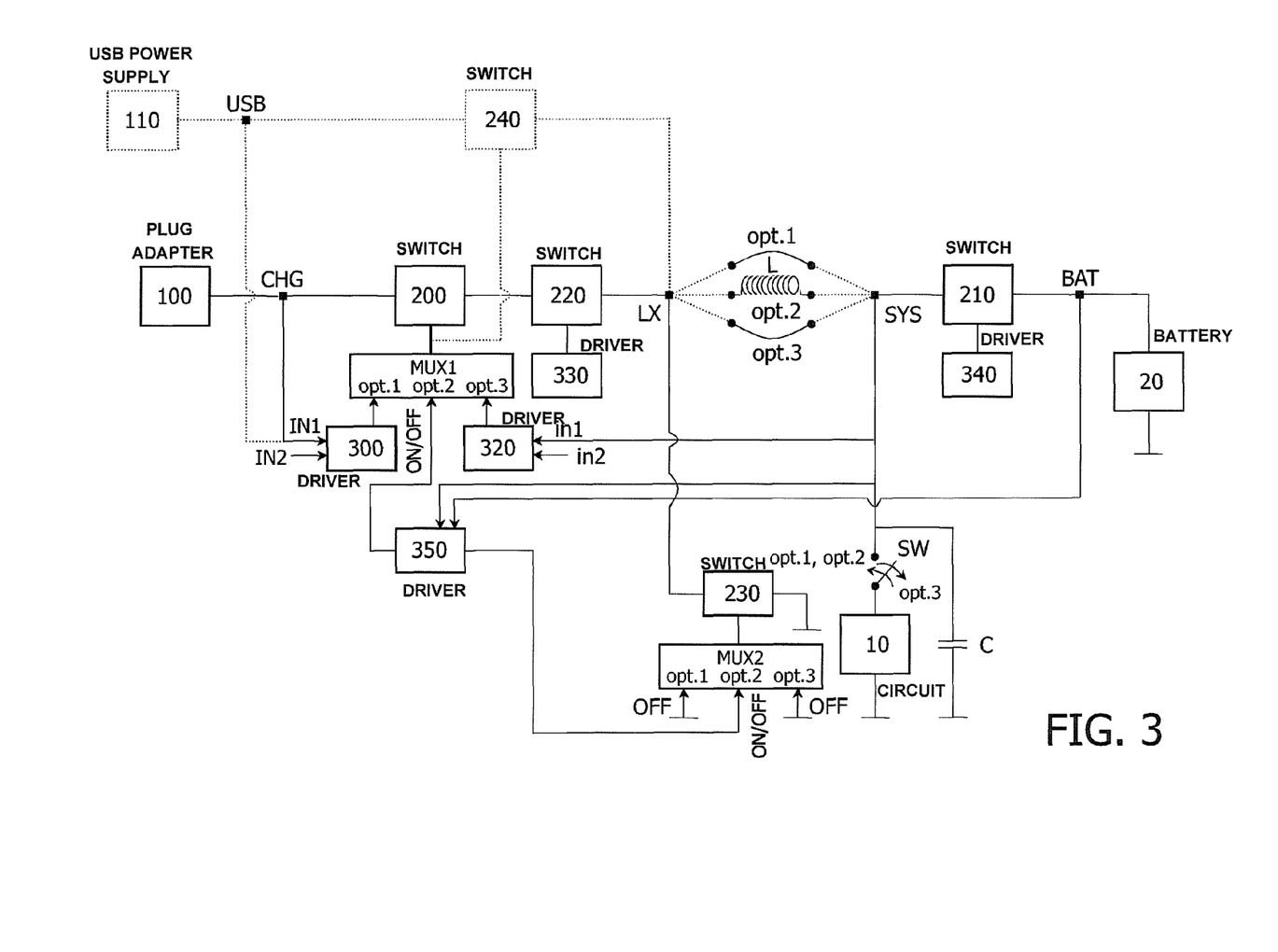
FIG. 3 shows a multi-purpose integrated battery charging circuit selectively configurable in a charge mode or in a charge-and-play mode according to the second preferred embodiment of the invention.

To address all types of market in terms of price, a second preferred embodiment comprising the first preferred embodiment will be described as follows. It consists in a multi-purpose integrated battery charging circuit able to be selectively configured in a simple charge mode for use by low-end solutions or in a charge-and-play mode for medium- and high-end solutions, while maintaining the supply voltage of the circuitry 10 with an acceptable signal-to-noise ratio, such as depicted in FIG. 3. This circuit includes driver circuits 300, 320, 330, 340, 350 such as digital controllers to control switching devices 200, 210, 220, 230, 240, multiplexers MUX1, MUX2 to select the different configuration options (opt.1, opt.2, opt.3) according to the type of portable and mobile electronic devices used, a battery 20 to be charged (opt.1, opt.2, opt.3) and, if removable and separated from its battery (opt.1, opt.2), a circuitry 10 to be played at the same time as the battery charge.

The circuit is powered by the wall plug adapter 100, but can also be alternatively supplied by any DC power source such as an USB power supply 110 for example, while being connected in parallel from the terminal LX. In this case, the pair of switching devices 200 and 220 will be no longer used and will be replaced by the switching device 240. The capacitor C connected in parallel to the circuitry 10 is an external output filter capacitor aiming to smooth the voltage transitions and to also play the role of a load capacitor when a DC-DC controller is used (opt. 2). The switching device 210 (e.g. a P-channel MOS transistor) will be a bi-directional switch controlled by the driver circuit 340. The latter 340 will enable a voltage $V_{BAT}$ or a current flowing from the terminal SYS to the terminal BAT to be maintained constant. If the circuitry 10 requires a current exceeding the maximum current susceptible to be provided by the DC power source 100, 110, then the driver circuit 340 will allow the current to be reverted and to flow from the terminal BAT to the terminal SYS through the switching device 210. Due to the voltage drop across the switching device 210, the voltage $V_{SYS}$ will become slightly lower than $V_{BAT}$. The switching devices 200, 220 will have the same polarity as the switching device 240 (e.g. P-channel MOS transistors) and will be connected in anti-series between the terminals CHG and LX so as to prevent or control any casual reverse mode operation in the event that the pin CHG is accidentally grounded. Both switching devices 200, 220 will act as ideal switches and will be hence considered as short-circuits in a forward mode, such that the voltage potentials at the terminals CHG and LX will be identical while satisfying the relation: $V_{CHG}=V_{LX}$. Moreover, the switching devices 200, 240 will be preferably power switching devices such as Power bipolar transistors or Power MOSFETs able to withstand high voltages (e.g. 10 V, 20 V) at the terminal CHG. The circuit will be selectively configured in a simple charge mode or in a charge-and-play mode using the selection made by the multiplexers MUX1 and MUX2. Three options will be selected according to the type of portable or mobile devices to be used. Thus, the options 3, 1 and 2 will respectively correspond to a low-end solution (not designed for being used in a charge-and-play mode), medium-end solution (used in a charge-and-play mode using no DC-DC converter and therefore no external coil) and high-end solution (used in a charge-and-play mode using external coil).

If the option 1 is chosen, then the portable or mobile electronic device owns a rechargeable battery 20 which is removable and separated from the circuitry 10 such as schematically depicted in FIG. 3 using the ON-state switch SW. The selection of the multiplexer MUX2 will result in deactivation of the switching device 230 while grounding its gate for example if a N-channel MOS transistor, whereas the switching device 220 that will have a polarity different from the switching device 230 will be turned on under the control of the driver circuit 330. The selection of the multiplexer MUX1 will cause the switching device 200 to be controlled by the driver circuit 300. The terminals SYS and LX will be short-circuited on the PCB by being connected between them, such that both terminals will be at the same voltage potential as the terminal CHG through the ON-state of the switching devices 200 and 220. In order to strongly minimize any ripples on $V_{SYS}$ while maintaining it at a voltage potential in the vicinity of $V_{BAT}$ and improve the efficiency of this configuration, the driver circuit 340 will be programmed for allowing the current which flows through the switching device 210 to increase and saturating the wall plug adapter current capability.

To offer secure protection from over voltage to the circuitry 10, the driver circuit 300 may comprise a comparator with a first input IN1 connected to the terminal CHG and a second input IN2 set to a maximum voltage level (e.g. 5.5 V) able to be withstood without damage by the circuitry 10 at the terminal SYS, which will turn off the switching device 200 whenever the voltage potential $V_{CHG}$ at the terminal CHG exceeds this voltage threshold.

Finally, the option 1 which exhibits a supplemental switching device 220 connected in anti-series with the switching device 200 corresponds to the configuration such as depicted in FIG. 1a and will be suited for medium-end solutions.

If the option 2 is chosen, then the portable or mobile electronic device owns a rechargeable battery 20 which is removable and separated from the circuitry 10 such as schematically depicted in FIG. 3 using the ON-state switch SW. The selection of the multiplexers MUX1 and MUX2 will cause the switching devices 200 and 230 to be driven by the same driver circuit 350 for determining an appropriate ON-OFF switching sequence, whereas the switching device 220 will be turned on under the control of the driver circuit 330. This driver circuit 350 will track the voltages $V_{BAT}$ and $V_{SYS}$ for regulating $V_{SYS}$ at a value slightly greater than $V_{BAT}$. The terminal SYS will be connected to the terminal LX on the PCB through an energy storage means such as an external coil L in order to avoid any overheating. Thus, a synchronous step-down DC-DC controller built with the switching devices 200, 220, 230, the external coil L and the driver circuit 350 will be implemented. The external filter capacitor C connected to the terminal SYS will then play the role of a load capacitor.

Thus, the option 2 corresponds to the configuration such as depicted in FIG. 2a and will be suited for high-end solutions.

If the option 3 is chosen, then the portable or mobile electronic device owns a rechargeable battery 20 which is not removable from the circuitry 10, such that the terminal SYS is no longer connected to the circuitry 10 such as schematically depicted in FIG. 3 using the OFF-state switch SW. The selection of the multiplexer MUX2 will result in deactivation of the switching device 230 while grounding its gate for example if a N-channel MOS transistor, whereas the switching device 220 controlled by the driver circuit 330 will be turned on. The selection of the multiplexer MUX1 will cause the switching device 200 to be controlled by the driver circuit 320. The terminals SYS and LX will be short-circuited on the PCB by being connected between them, such that both terminals will be at the same voltage potential as the terminal CHG through the ON-state of the switching devices 200 and 220. Unlike the previous options, the option 3 authorizes a larger heat dissipation and therefore a poorer efficiency while allowing the switching device 200 to remain turned on even if the voltage potential $V_{CHG}$ at the terminal CHG increases up to 10 or even 20 V. Thus, the driver circuit 320 may comprise an amplifier with a first input in1 connected to the terminal SYS and not to the terminal CHG as found in the option 1, and a second input in2 set to a reference voltage (e.g. 5.5 V) which will regulate the switching device 200 whenever the voltage potential $V_{SYS}$ at the terminal SYS reaches this voltage threshold.

Unlike the previous options, the switching device 200 which is a power switching device is no longer controlled by $V_{CHG}$ but by a reference input voltage such that it must be able to withstand high voltages at the terminal CHG while being maintained in conduction mode and regulating $V_{SYS}$ at 5.5 V at maximum. Due to a greater heat dissipation, a poorer efficiency will have to be accepted by the user.

Therefore, the option 3 corresponds to the configuration of a simple battery charge circuit and will be suited for low-end solutions.

It is noted that the invention such as described according to the preferred embodiments can be made from a single silicon implementation while offering a high degree of flexibility. The multiplexers MUX1 and MUX2 can be driven by a software, whereas the terminals CHG, LX, SYS, BAT are part of the pin configuration available on the PCB. Therefore, the multi-purpose integrated battery charging circuit is configured such a manner as any one of the three options can be chosen without the need of any change in the Silicon Intellectual Property (IP).

As already quoted in the specification, it is noted that the invention can be used by any electronic devices having a rechargeable battery such as the mobile phones, the PDAs or the portable computers for example.

In summary, a multi-purpose integrated battery charging circuit configuration able to be selectively in a simple charge mode when intended for low-end solutions (option 3) or in a charge-and-play mode when intended for medium- and high-end solutions (options 1 and 2 respectively), while maintaining the supply voltage of any portable and mobile electronic devices with an acceptable noise level, has been described. The selection will be made possible by the use of multiplexers (MUX1, MUX2). If the option 1 is chosen, the bi-directional switching device 210 will be controlled by a driver circuit 340 for allowing the current which flows through it towards the battery 20 to strongly increase and thereby maintaining the voltage across the circuitry 10 at a value in the vicinity of the voltage across the battery 20. If the option 2 is chosen, the synchronous step-down voltage regulator 310 comprising at least the driver circuit 350 and the switching devices 200, 230 will track the voltages across the circuitry 10 and the battery 20 for regulating the voltage across the circuitry 10 at a value slightly greater than the voltage across the battery 20. If the option 3 is chosen, the battery 20 which cannot be separated from the circuitry 10 will be in a simple charge mode while being charged through the switching device 210.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. A multi-purpose battery charging circuit configuration configured to be selectively configurable in a charge-and-play mode that is configured to operate a circuit that is separated from an associated battery and simultaneously charge the battery or operate in a simple charge mode to charge the battery coupled to the circuit, the multi-purpose battery charging circuit configuration comprising:
   a first switching means coupled between a first node and a fourth node;
   a bi-directional switching means coupled between a second node and a third node, the bi-directional switching means configured to allow a current flowing from the second node towards the third node to be reverted in order to flow from the third node towards the second node, the bi-directional switching means comprising a semiconductor switching device configured to be controlled by a fourth driver means, wherein the driver means is configured to allow the current flowing from the second node towards the third node to be increased;
   a first multiplexing means configured to select a driver means from among at least a first, a second, and a third driver means, the selected driver means configured to control the first switching means;
   a second multiplexing means configured to select the second driver means when the first multiplexing means selects the second driver means, the second driver means configured to control a second switching means coupled to the fourth node, and to deactivate the second driver means when the first multiplexing means selects the first driver means or the third driver means, wherein the current is configured to flow through an external energy storage means when the first multiplexing means selects the second driver means, or a short-circuit means when the first multiplexing means selects the first driver means or the third driver means, the external energy storage means or the short-circuit means being coupled between the fourth node and the second node; and
   a voltage regulator means comprising at least the first switching means, the second switching means, and the second driver means.

2. The multi-purpose battery charging circuit configuration according to claim 1, wherein the selected first driver means includes a first input and a second input, the first input coupled to the first node and the second input coupled to a first reference voltage, the first switching means configured to be switched off when the first input has a voltage potential greater than the second input.

3. The multi-purpose battery charging circuit configuration according to claim 1, wherein the selected third driver means includes a first input and a second input, the first input coupled to the second node and the second input coupled to a second reference voltage, the first switching means configured to be switched off when the first input has a voltage potential greater than the second input.

4. The multi-purpose battery charging circuit configuration according to claim 1, wherein the voltage regulator means comprises a DC-DC controller means comprising a switched operating mode, and a step-down DC-DC controller.

5. The multi-purpose battery charging circuit configuration according to claim 4, wherein the external energy storage means comprises at least one of an inductor and a coil.

6. The multi-purpose battery charging circuit configuration according to claim 1, wherein any one of the driver means comprises a combined digital and analog controller means.

7. The multi-purpose battery charging circuit configuration according to claim 1, wherein the first switching means comprises at least one of a power metal oxide semiconductor field effect transistor, a bipolar junction transistor, and any other controllable semiconductor switching device.

8. The multi-purpose battery charging circuit configuration according to claim 1, wherein a second switching means is configured to be controlled by the driver means that is coupled in anti-series between the first switching means and the fourth node.

9. The multi-purpose battery charging circuit configuration according to claim 1, wherein the multi-purpose battery charging circuit comprises an integrated circuit made from a single silicon implementation.

10. A multi-purpose battery charging method for selectively providing a charge-and-play mode in which a circuit is operated that is separated from an associated battery while the battery is simultaneously charged, or a simple charge mode in which the battery that is coupled to the circuit is charged, the multi-purpose battery charging method comprising:

regulating the voltage of a second node, which is coupled to the circuit, using a first switching means coupled between a first node and a fourth node, the first node being coupled to a power supply means;

allowing a current flowing from the second node towards a third node to be reverted in order to flow from the third node towards the second node, the third node being coupled to the battery, the reverting being controlled by a fourth driver means, wherein the fourth driver means is configured to allow the current flowing from the second node towards the third node to be increased;

selecting, by using a first multiplexing means, a driver means from among at least a first, a second, and a third driver means, the selected driver means configured to control the first switching means;

when the first multiplexing means selects the second driver means, selecting, by using a second multiplexing means, the second driver means, the second driver means configured to control a second switching means coupled to the fourth node;

when the first multiplexing means selects the first driver means or the third driver means, deactivating the second driver means; and when the first multiplexing means selects the second driver means, getting the current to flow through an external energy storage means, or a short-circuit means when the first multiplexing means selects the first driver means or the third driver means, the external energy storage means or the short-circuit means being coupled between the fourth node and the second node, wherein the regulating the voltage of the second node being performed by a voltage regulator means comprising at least the first switching means, the second switching means, and the second driver means.

11. A multi-purpose battery charging method according to claim 10, wherein the first driver means includes a first input and a second input, the first input coupled to the first node and the second input coupled to a first reference voltage, the method further comprising switching off the first switching means when the first input has a voltage potential greater than the second input.

12. A multi-purpose battery charging method according to claim 10, wherein the third driver means includes a first input and a second input, the first input coupled to the second node and the second input coupled to a second reference voltage, the method further comprising switching off the first switching means when the first input has a voltage potential greater than the second input.

* * * * *